UNITED STATES PATENT OFFICE.

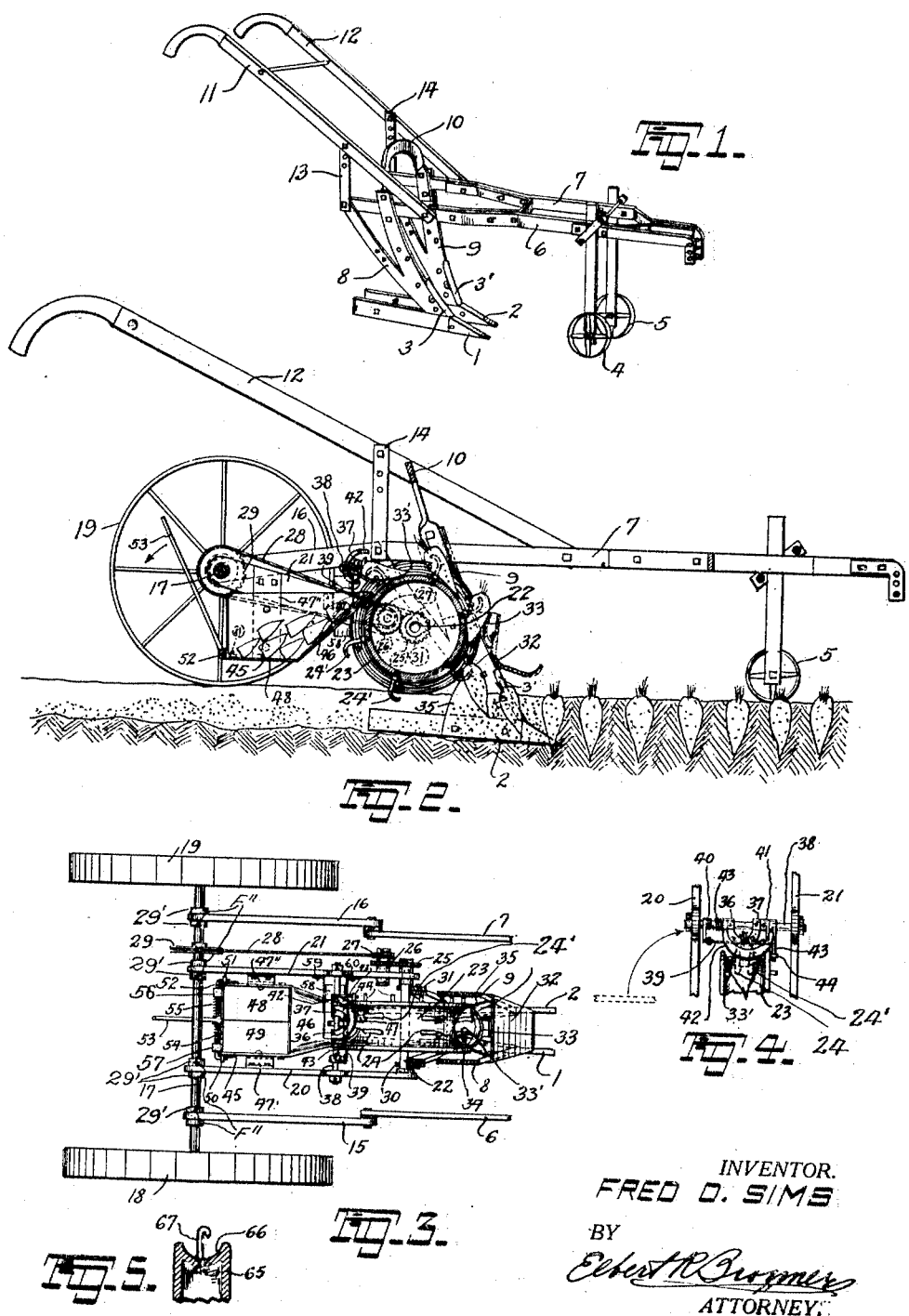

FRED DRYDEN SIMS, OF OAKLAND, CALIFORNIA.

BEET PULLER AND TOPPING MACHINE.

1,258,367.  Specification of Letters Patent.  Patented Mar. 5, 1918.

Application filed February 5, 1917. Serial No. 146,693.

*To all whom it may concern:*

Be it known that I, FRED D. SIMS, a citizen of the United States, residing at 578 30th street, city of Oakland, in the county of Alameda, State of California, have invented a new and useful Beet Puller and Topping Machine, of which the following is a specification in such full and clear terms as will enable those skilled in the art to construct and use the same.

This invention relates to a beet puller and topping machine, and the object of the invention is to top the heads of the beets as they are being harvested from the ground, by a series of grabbing hooks on a rotatable drum which conveys the beets to a stationary knife which beheads the tops, the beets being forced past the knife by a paddle which engages the pin projections on the drum, the paddle returning to its original position by means of a spring action, to push the next beet, after escapement from the projections. The topping attachment is adaptable for connecting to any make of a puller.

Another object of the invention is the simplicity of the topping attachment which may be so made as to connect to any make of a puller. It is to be understood that the beet topping attachment may be applied to any make of beet puller.

Other objects of the invention will appear as the description proceeds:—

Figure 1 is a perspective view of a beet puller with holes in side standards for attaching the beet topping device.

Fig. 2 is a longitudinal section of the beet puller with the beet topping device attached thereto, showing the operation of the beets thereon.

Fig. 3 is a plan view of the beet topping attachment, without beets showing the connections to the beet puller, which is partially shown.

Fig. 4 is a plan view above cutting knife, illustrating a beet in a position to be topped.

Fig. 5 is a modified form of a portion of a drum having a single row of grabbing hooks.

With these objects in view, the invention comprises various features of construction, as hereinafter set forth in the following specification and drawings, in which the same numeral is applied to the same portion throughout; however, I am aware that there may be many modifications thereof.

Numerals 1 and 2 indicate the adjustable shoes attached to the puller, 3 and 3' the shins, 4 and 5 the adjustable gage wheels to regulate the depth of the shoes, 6 and 7 the side frame members of the draft hitch 7', which may be drawn by motive power or otherwise, 8 and 9 represent shoe standards and 10 the arched brace. Handles 11 and 12 have adjustable supports 13 and 14. The attachment or the grabbing and topping device to the puller has links 15 and 16 to connect the beet puller side frame members 6 and 7 to the shaft 17, connecting traction wheels 18 and 19 secured thereon. Members 20 and 21 connect the shaft 17 with shaft 22, upon which is a rotatable drum 23, having short hooks 24 and longer hooks 24' thereon, for engaging the beets as they are conveyed from the ground by the shoes of the puller. For rotating the drum a gear 25 is secured to shaft 22 which engages a similar gear 26 having a sprocket 27 fastened thereto, connecting with a chain 28 to a sprocket 29 on trailer shaft 17, said sprockets being in alinement for the operation of the chain by means of ordinary set collars 29' secured to the shaft 17 adjacent to the links 15, 16 and members 20, 21. Plates 30 and 31 secure shaft 22 in a stationary position; however, it is to be understood that this shaft may have adjustable features for setting the drum to any desirable position.

A guide housing 32 extended in front of the drum 23 is for guiding and positively grabbing the beets on to the hooks, has a spring 33 to position the beet into the groove 33' on drum 23. The tension of this spring is very slight, merely sufficient to press beet lengthwise into groove, the J shape hooks 24, having a thin knife blade edge allowing beets to adjust themselves easily thereon. This housing 32 is secured to side standards 8 and 9 of the puller. Aprons 34 and 35 tend to lift beets up to engage grabbing hooks 24 which convey beets to gaging plates 36 and 37 secured to the shaft 38 which is fastened to members 20 and 21. The beet adjusts itself at the proper gage to be beheaded by a stationary knife crosswise of drum 39 secured to supporting arms 40 and 41 secured to the stationary shaft 38. It is to be understood that the stationary knife 39 and revolving hooks 24 may be so fitted as to be interchangeable at any time. As the beet head engages knife, it is forcibly topped by a paddle 42 having an extension arm 43, engaging pins 44, there being a plurality of these pins on side of drum, each slightly in advance of the row of the hooks to engage the extension arm 43 for the forcing of the paddle 42 to top the beets. A coil spring 43′ has one end fastened to the side portion of the paddle, and the other end to the stationary shaft 38 for the purpose of returning the paddle 42 to the neutral position. Box 45 having a chute 46 receives the falling beets after they are topped, a slot 47 releasing the beets from the hooks 24. The box is supported by brackets 47′ and 47″, and in the bottom are two hinged doors 48 and 49 having lugs 50 and 51 at hinged ends, engaging the ends of shaft 52, which has a handle 53 secured thereto. Springs 54 and 55 have one of their ends fastened to support brackets 56 and 57 secured to the box, and the other ends to the shaft 52. When the box has received a number of beets, they are dumped on ground by throwing the lever in the direction of the arrow. It is to be understood that means may be used to automatically dump the beets from the box, and also the topping of the beets may be done at a greater height in order to accommodate a large number of beets for dumping. An inclined chute 58 held by supports 59 and 60 conveys the toppings to the ground. Fig. 5 is a modified form showing a single row of hooks in which a portion of the drum in section is indicated at 65, the groove at 66 and a plurality of hooks 67 secured thereto similarly spaced as in the original form of the double hooks. The spacing of the hooks around the drum in the groove portion can be determined by experiment but should be about the distance the beets lie in the row that is being plowed by the puller, which is generally about six to eight inches, the travel of the hooks being the same or may be faster than the ground traversed. It is to be understood that the method of drive from the trailer shaft 17 to propel the drum with the hooks thereon may be by other means than as shown. The essential part of the invention is in the rotatable drum having hooks to pick up the beets after being plowed from the ground and conveyed to a stationary knife for topping, and means to force the beet to be topped, one of the objects of the two hooks on the drum as shown in the drawings one shorter than the other, is to hook two beets should they be side by side.

Having thus described my invention, what I claim as new and desire to secure by Letters Patent of the United States, reservation being expressly made of permissible modifications is as follows:—

1. A beet puller and topping machine comprising a trailer with traction wheels secured thereon, connected to the beet puller frame; means to drive in an opposite direction to the traction wheels a rotatable drum from said trailer; said drum connected to the said beet puller frame; said puller frame having adjustable shoes attached thereto; said drum positioned above shoes on said puller; a plurality of hooks spaced and secured to said drum; positive means to engage beets onto said hooks; and a knife crosswise to said drum for topping the beets as conveyed on said hooks.

2. A beet puller and topping machine comprising a trailer having traction wheels; means to connect said trailer to the beet puller frame; means to drive in an opposite direction to the traction wheels on said trailer, a rotatable drum having grabbing hooks secured thereto; said drum connected to frame of the beet puller; said puller frame having adjustable shoes attached thereto; said drum positioned near shoes of said beet puller; positive means to engage beets on to said hooks; a stationary knife crosswise of drum at a point to top the heads of the beets when conveyed thereto, and means to force the beheading of said beets.

3. A beet puller and topping machine, comprising a trailer having traction wheels; means to connect said trailer to the beet puller frame; said puller frame having adjustable shoes attached thereto; means to drive in an opposite direction to the traction wheels a rotatable drum having knife edge hooks secured thereon; said drum attached to the frame of the said beet puller; said hooks being so spaced as to engage beets lifted from the ground by the adjustable shoes attached to said beet puller; positive means to engage beets onto said hooks; means to position said beets into a grooved portion on said drum to engage a stationary cutting knife at a right angle for serving the head of said beet; means to force the said beet to be beheaded; means to gage a cutting line; and depository means for both the beheaded beets and toppings.

4. A beet puller and topping machine comprising a trailer having traction wheels; means to connect trailer to said beet puller frame; means to drive in an opposite direction to the traction wheels a rotatable grooved shaped drum having knife shaped hooks secured thereon; said drum attached to the frame of the beet puller; said beet puller having adjustable shoes attached thereto; said drum so positioned next to shoes of the said beet puller as to pick up beets lifted from the ground by said shoes; positive means to engage beets onto said hooks; means to place beets lengthwise and adjacent to the groove on said drum; a stationary cutting knife placed so as to engage heads of beets on a perpendicular plane; means to force beets to be topped; depository means to receive the beets after topping; means to convey toppings to the ground; and means to dump the beets on to the ground from its depository.

5. A beet puller and beet topping machine, comprising a frame having shoes fastened thereto; handles secured to said frame for manual control; said frame having a hitch thereon for drafting; a trailer connected to said frame; said trailer having a shaft secured to traction wheels at ends thereof; frame members extending from said shaft connecting to a shaft having a rotatable drum secured thereon; driving means from said shaft to said drum; said drum being rotated in an opposite direction to the traction wheels; said drum having a grooved shaped portion extending its entire circumference; J shaped hooks having a thin knife blade portion at ends thereof; said hooks secured into the grooved portion of said drum to engage beets as shoes lift said beets from ground; positive means to engage beets on to said hooks; a spring to force beets lengthwise with said grooved portion; gaging plates to gage the beets for topping; a stationary cutting knife crosswise of said drum; said knife fastened to the supporting arms; said gaging plates secured to said stationary shaft; a paddle loosely mounted on said shaft; a coil spring having one end fastened to said shaft and the other end to said paddle; a plurality of pin projections on side of said drum; an extension on said paddle to engage said projections to force beets heads over cutting edge of knife; a box to receive said beets after topping; a slot in said box for hooks on drum to pass through and to release beets from said hooks and means to dump beets on to ground from said box in quantities and means to convey toppings onto ground.

6. A beet puller and topping machine, comprising a frame having shoes secured thereon to side standards; handles fastened thereon; a trailer having a shaft with traction wheels fastened on the ends thereof; frame members connecting said shaft to a shaft having a rotatable drum secured thereon; means to drive said drum from the shaft of said trailer, in an opposite direction to the traction wheels; a double row of knife edge hooks secured to the grooved portion of said drum; said hooks spaced to engage beets as lifted out of ground by shoes; one row of hooks longer than the other; positive means to engage beets on to said hooks; a stationary cutting knife to top heads of beets on the hooks, when conveyed thereto by said drum; means to engage heads of beets to determine a cutting line; means to force the beet past the cutting knife; means to deposit the topped beets into a receptacle for dumping on to the ground in quantities and to deposit toppings on to ground.

7. A beet topping attachment for a beet pulling machine comprising a trailer having traction wheels secured to the shaft thereof; said trailer connected to the frame of said beet pulling machine; means to drive in an opposite direction to the traction wheels a rotatable drum secured on a shaft connected to the trailer shafts; hooks secured in the grooved portion of said drum; said hooks so placed to correspond in engaging beets as lifted out of ground by adjustable shoes attached to the said beet puller frame; positive means to engage beets onto said hooks; a stationary knife to serve heads of beets as conveyed by hooks on drum; means to determine cutting line for topping the heads of the beets; pins on side of drum to correspond to each hook on side drum; an extending paddle portion loosely mounted on a stationary bearing having an extension to engage said pins for the purpose of forcing the paddle portion of the body of the beet to positively top the beet head; means to return said paddle portion to its neutral position to engage similarly the next approaching beet; and means to deposit the beets in a storage receptacle to be dumped onto the ground in quantities.

In testimony whereof I have hereunto set my hand on this 26th day of January, A. D. 1917, in the presence of a subscribed witness.

FRED DRYDEN SIMS.

Witness:
W. W. HEALEY.

Copies of this patent may be obtained for five cents each, by addressing the "Commissioner of Patents, Washington, D. C."